United States Patent
Zimmerle

(10) Patent No.: US 12,020,874 B2
(45) Date of Patent: Jun. 25, 2024

(54) STEPPED STROKE BUTTON

(71) Applicant: elobau Gmbh & Co. KG, Leutkirch (DE)

(72) Inventor: Jürgen Zimmerle, Maierhöfen (DE)

(73) Assignee: ELOBAU GMBH & CO. KG, Leutkirch (DE)

( * ) Notice: Subject to any disclaimer, the term of this patent is extended or adjusted under 35 U.S.C. 154(b) by 31 days.

(21) Appl. No.: 17/573,661

(22) Filed: Jan. 12, 2022

(65) Prior Publication Data
US 2022/0277909 A1   Sep. 1, 2022

(30) Foreign Application Priority Data
Mar. 1, 2021 (DE) .................... 10 2021 104 812.5

(51) Int. Cl.
*H01H 13/20* (2006.01)
*F21V 8/00* (2006.01)
*H01H 13/02* (2006.01)
*H01H 13/14* (2006.01)

(52) U.S. Cl.
CPC ............. *H01H 13/20* (2013.01); *G02B 6/006* (2013.01); *H01H 13/023* (2013.01); *H01H 13/14* (2013.01)

(58) Field of Classification Search
CPC ...... H01H 13/83; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52;
(Continued)

(56) References Cited

U.S. PATENT DOCUMENTS 4,298,778 A * 11/1981 Beresford-Jones .... H01H 13/06
200/333
6,080,941 A * 6/2000 Yokobori ............... G05G 9/047
200/6 A
(Continued)

FOREIGN PATENT DOCUMENTS

DE      10210984 A1   10/2003
DE   102005028049 A1    1/2006
(Continued)

OTHER PUBLICATIONS

"TASTE" in: Wikipedia, Die freie Enzyklopädie; Bearbeitungsstand: Jan. 16, 2021, 13:17; URL: https://de.wikipedia.org/wiki/Taste; abgerufen am Aug. 10, 2021, 4 pages.

*Primary Examiner* — Ahmed M Saeed
(74) *Attorney, Agent, or Firm* — Dickinson Wright PLLC

(57) ABSTRACT

A stepped stroke button includes a transmission unit having a first end and a second end opposite the first end; an operating unit arranged at the first end; and a contact unit arranged at the second end and axially guided in a first guide. At least one of the operating unit and the contact unit is configured to be axially movable with respect to the transmission unit, wherein during operation of the stepped stroke button, an operating stroke occurring relative to the first guide is configured differently from a mediated contact stroke occurring relative to the first guide. The ratio of the operating stroke to the contact stroke is greater than 1:1 and the operating stroke is greater than or equal to 1.5 mm.

17 Claims, 3 Drawing Sheets

(58) Field of Classification Search
CPC ...... H01H 13/703; H01H 13/507; H01H 3/12; H01H 13/20
See application file for complete search history.

(56) References Cited

U.S. PATENT DOCUMENTS

| | | | |
|---|---|---|---|
| 8,207,805 B2* | 6/2012 | Wild | ...................... H01H 13/52 200/341 |
| 2003/0214816 A1 | 11/2003 | Barlian et al. | |
| 2005/0034966 A1* | 2/2005 | Krebs | .................... H01H 13/64 200/341 |

FOREIGN PATENT DOCUMENTS

| EP | 2704171 A1 | 3/2014 |
|---|---|---|
| WO | 2015036143 A1 | 3/2015 |

* cited by examiner

STEPPED STROKE BUTTON

TECHNICAL FIELD

The present invention relates to a stepped stroke button, comprising a transmission unit, an operating unit and a contact unit guided on a first guide, the operating unit and/or the contact unit being configured to be axially movable with respect to the transmission unit, particularly for use in vehicles and work machines in construction and agricultural engineering.

BACKGROUND

Such work machines and vehicles are often controlled via multifunction joysticks and buttons arranged on or next to them for the selection and control of certain movement processes of the machines or vehicles. Since the operators are usually exposed to strong noise and vibrations, correct and fail-safe actuation of these buttons is more difficult, particularly the detection of a completed and successful actuation process. However, this detection is essential to avoid errors in the operation of the machine, the vehicle.

One option for signaling a successful actuation is a long operating stroke of the button, so that the operator receives clear haptic feedback when the button is actuated, even under the influence of vibration or through his gloves. However, a long operating stroke also requires increasing the installation space of the button. This is usually not available in the usual operating environments, also because a plurality of buttons is accommodated on control panels and this plurality cannot be enlarged to the same extent.

Such buttons should also be arranged ergonomically with respect to one another in order to avoid larger operating movements, which cannot always be achieved with increased installation space. Finally, a long operating stroke can also shorten the service life of the button, since more wear and soiling surface are present.

SUMMARY

The present invention therefore sets itself the task of proposing a stepped stroke button having haptic feedback that can be safely operated.

This object is achieved by a stepped stroke button comprising a transmission unit having a first end and a second end opposite it, an operating unit arranged at the first end and a contact unit arranged at the second end and axially guided in a first guide, the operating unit and/or the contact unit being configured to be axially movable with respect to the transmission unit, an operating stroke occurring relative to the first guide when in use being configured differently from a mediated contact stroke occurring relative to the first guide when in use, the ratio of operating stroke to contact stroke being greater than 1:1. The word "unit" in this context designates a monolithic part or an assembly of parts affixed to each other. In the shown examples, each unit is a monolithic part.

The arrangement of the operating and contact unit on the transmission unit is configured according to the invention as a point, line or surface contact. A line or surface contact advantageously reduces the effect of occurring transverse forces, since the contact plane is configured orthogonal to an axial stroke axis. This enables sliding with as little loss as possible between the operating unit, transmission unit, contact unit and first guide. According to the invention, the transmission unit is configured as a rigid unit, the term "rigid" in the context of this invention meaning that the unit shows no or only a very slight deformation when operating forces act thereon. According to the invention, the operating unit transmits a movement of the operator via the transmission unit to the contact unit, which in turn opens or closes an electrical contact. It is particularly advantageous here for the ratio between the operating stroke and the contact stroke to be greater than 1. According to the invention, the path translation takes place via an initial free travel of the operating unit, the operating unit exerting no effect on the contact unit in its rest position within the free travel. Only when the free travel is exceeded is the movement of the operating unit transmitted to the contact unit by the transmission unit, so that there is a uniform movement in the same direction of the operating unit and contact unit. This gives the operator sufficient haptic feedback without impairing or having to change the effective stroke of the button.

This stroke path ratio makes it possible to maintain the previous size of such buttons with great advantage; the increased operating stroke does not require any adaptation of the external dimensions of the button itself. The operating unit, the transmission unit and the contact unit according to the invention are advantageously arranged coaxially with one another, so that the free travel of the operating unit can be accommodated in the design of the respective units. In this way, joints or other elements having radial movement components are advantageously dispensed with, and the transmission of movement is therefore as low-loss as possible.

An embodiment of the invention provides that the ratio of operating stroke to contact stroke is between 1.0001:1 and 2:1, preferably 1.5:1 and particularly preferably equal to 2:1 and/or the operating stroke being ≤1.5 mm, particularly ≤2 mm. The transmission ratios or stroke paths are an optimal compromise between the smallest possible size of the stepped stroke button and optimal actuation security for a user. A ratio of >2:1 is, however, also according to the invention, as is operating strokes of ≤5 mm up to 20 mm.

In an embodiment of the invention, it is provided that an axial force exerted on the operating unit by an operator when in use acts at least partially through the transmission unit on the contact unit. This embodiment enables the provision of restoring units, the restoring forces of which are selected according to the invention so that an axial displacement of the stepped stroke button against them can be applied without any problems by an operator for actuating the stepped stroke button. A usual axial actuation force is between 2-10 N, accordingly the counterforces of the restoring units are configured so that they do not exceed 10 N in total. It is also according to the invention to design the transmission unit itself as an elastic unit, particularly as a compression spring unit. Depending on the choice of the spring constant, the contact stroke is delayed and/or shortened in relation to the operating stroke. According to the invention, the spring constant within this usage environment is selected so weak that the ratio of operating stroke to contact stroke is greater than 1:1, particularly a spring constant according to the invention is between 2,000-10,000 N/m.

A further development of the invention provides that at least one first restoring unit acts at least indirectly on the contact unit and the operating unit, particularly at least one second restoring unit acts at least indirectly on the operating unit. The first restoring unit acts with great advantage directly on the contact unit and indirectly on the operating unit and the second restoring unit acts directly on the operating unit. Since the operating stroke, which is greater in relation to the contact stroke, does not allow a complete restoration of the operating unit by restoring the contact stroke, the second restoring unit is provided, which takes the operating unit to its initial position via the free travel.

An arrangement of the first restoring unit between the first guide and contact unit and between the transmission unit and the housing is also according to the invention. A rigid connection between the transmission unit and the contact unit is advantageous with this arrangement of the first restoring unit, since the first restoring unit also restores the transmission unit in this way. The rigid connection is achieved according to the invention by gluing, soldering or screwing. This rigid connection is also according to the invention in direct action of the first restoring unit on the contact unit. According to the invention, the second restoring unit is arranged between the operating unit and the housing, between the operating unit and the transmission unit, between the transmission unit and the contact unit, or between the transmission unit and the housing. Since the second restoring unit acts at least indirectly on the operating unit, there is also a loose connection between the unit on which the second restoring unit is arranged and the contact unit. The first restoring unit is particularly advantageously configured as a sheet metal spring arranged below the contact unit, preferably a microswitch. This leads to a high level of reliability of the component and avoids otherwise necessary actuation units, which advantageously minimizes complexity and size. According to the invention, the first and second restoring units are configured as spiral springs, electromechanical or electromagnetic actuators or as pneumatic or hydraulic units.

An embodiment of the invention provides that the stepped stroke button comprises a housing, the housing preferably comprising a first and a second housing part, the first guide, the contact unit, the first restoring unit, the transmission unit and the operating unit being accommodated in the first housing part and the second restoring unit being accommodated in the second housing part. It is advantageously configured in a plurality of parts in order to reduce complexity and thus the costs of manufacturing the housing and to save material. According to the invention, the second and/or the first housing part are also configured to accommodate a plurality of stepped stroke buttons next to one another. The preferred division of the housing into two parts is advantageous since seals can be arranged on and between the housing parts and further fixing means can be dispensed with.

A further development of the invention provides that the second restoring unit is an elastic bellows, particularly arranged between the operating unit and the housing and preferably configured as a compression spring unit. The elastic bellows can be easily adapted to the geometries of the operating unit and housing; it is preferably made of rubber-like materials such as NBR or EPDM or, particularly, silicone. With these materials, deformation leads to a restoring force that returns the bellows to its initial position.

An embodiment of the invention further provides that the second restoring unit is configured as a seal between the operating unit and the housing, particularly as a labyrinth seal arranged on the second housing part. Such an arrangement particularly advantageously combines two key functions within one unit: on the one hand, the arrangement protects the components located in the housing space from dirt, water and other environmental influences. On the other hand, this increases the tightness of the switch or button, so that the button according to the invention can be cleaned with large amounts of water at high speeds without any problems, so steam jets can be used. According to the invention, the seal between the second restoring unit and the housing has a degree of protection of at least IP69K.

According to the invention, the first housing part comprises at least one first stop for the transmission unit and the transmission unit comprises at least one second stop for the operating unit, the first stop particularly being configured as a radially fully encircling stop. The first and the second stop advantageously limit the movements of the operating unit or the transmission unit generated by the restoring units. The greater the distance between the first and second stop, the greater the axial path that can be moved independently of one another and thus the greater the free travel.

A further development of the invention provides that the first housing part comprises a second guide, the transmission unit being guided over the second guide and the transmission unit comprising a third guide, the operating unit being guided over the third guide. According to the invention, the first and second guides are each formed by projections, particularly by vertically extending ribs, as a result of which the friction losses are advantageously reduced via line contacts. According to the invention, the shape and position tolerances are tighter in a guide region than in a region that does not influence the guide, in order to ensure reliable guidance and to keep the production costs as low as possible.

According to the invention, the stepped stroke button also comprises a display unit, at least one unit from the operating unit or the transmission unit being configured as a light guide unit. According to the invention, the display unit is configured as an LED and is continuously active. LEDs are long-lasting with a high degree of efficiency and are small. However, all types of illumination are in accordance with the invention. According to the invention, the display unit is arranged on the same circuit board as the contact unit in order to avoid additional lines that would otherwise be necessary. According to the invention, materials such as completely or partially transparent plastics and glass fiber materials are suitable as light guides. With great advantage, the light guide is constantly close to the light source because of the idle stroke and the display unit is therefore particularly bright with the same illumination of the light source. In other words, the distance between the light guide and the light source is not, or is only slightly, greater than the contact stroke.

The invention is explained in more detail below with reference to an embodiment with reference to the figures of the drawings.

DETAILED DESCRIPTION OF THE DRAWINGS

Figure 1:
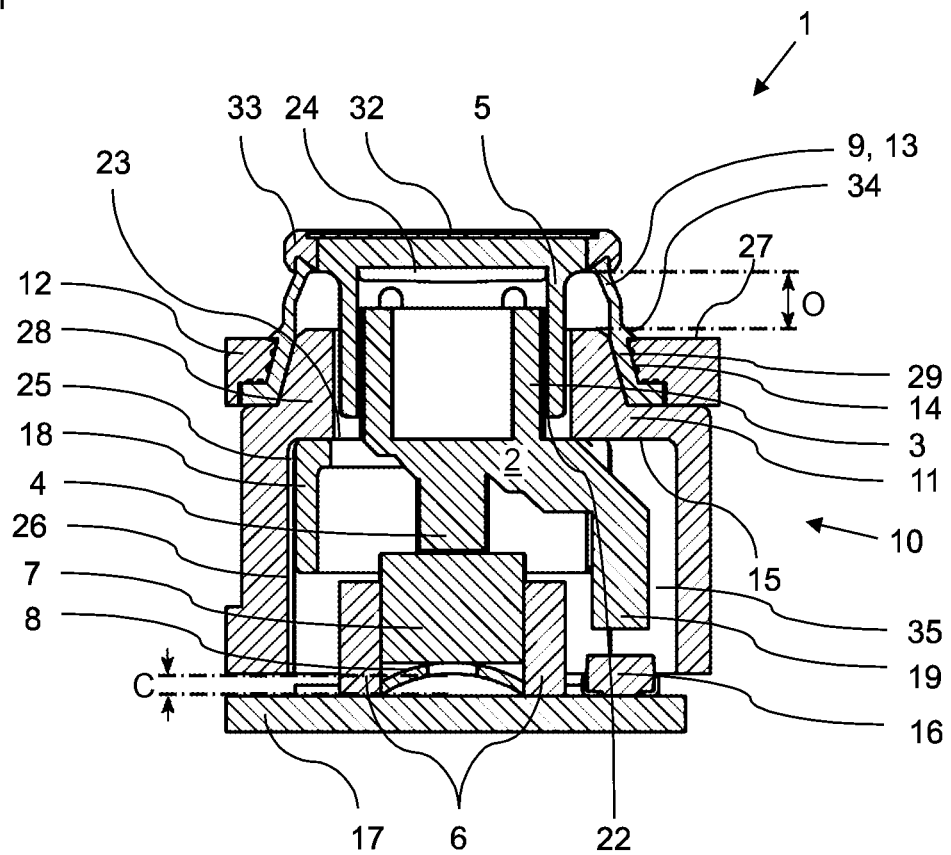
FIG. 1 shows a first sectional view in an initial position of the stepped stroke button.

FIG. 1 shows a first sectional view in an initial position of the stepped stroke button 1, a contact unit 7 being mounted so as to be axially displaceable via a first guide 6 and being arranged at a distance from a circuit board 17. A first restoring unit 8 is arranged between the contact unit 7 and the circuit board 17. A transmission unit 2 is also arranged above the contact unit 7. The transmission unit 2 has a first end 3 and a second end 4, the first end 3 comprising a polygonal hollow body and the second end 4 having a cylindrical shape. The shaped bodies of the first and second ends 3, 4 are arranged coaxially to one another. The transmission unit 2 comprises a hollow body-shaped frame 18 in the same direction of extent as the second end 4, the wall thickness of the frame 18 being significantly increased, particularly at least doubled, in a sub-region 19. This sub-region 19 also has a greater axial length, particularly the sub-region 19 is at least 1.5 times as long as the frame 18 and is configured to be eccentric. The sub-region 19 is spaced apart from a display unit 16 in an initial position. The display unit 16 is arranged adjacent to the first guide 6 on the circuit board 17. An operating unit 5 is arranged above the transmission unit 2. This also has a polygonal hollow body closed on one side. An open end face 22 of the operating unit 5 is formed parallel to a stop face 23 formed orthogonally to the first end 3 and is arranged at a distance therefrom. The first end 3 is also arranged at a distance from an inner end face 24 of the operating unit 5.

The first guide 6, the contact unit 7, the first restoring unit 8, the transmission unit 2 and the operating unit 5 are at least partially accommodated in a first housing part 11. The first housing part 11 has a shape, particularly adapted to the outer contours of the transmission unit 2 and the operating unit 5, an outer surface 25 of the frame 18 being formed at a distance from a housing part inner surface 26. The stop surface 23 is in contact with a first stop 15, the first stop 15 being configured as a surface of the first housing part 11 running parallel to the stop surface 23 and limiting the upward axial movement of the transmission unit 2. A tapering region 28 of the first housing part 11 is formed above the first stop 15, the operating unit 5 being arranged within the tapering region 28. An edge 33 is formed on an outer end face 32 of the operating unit 5, which edge 33 is formed particularly from an elastic rubber. A first end of a second restoring unit 9 is arranged between the operating unit 5 and the edge 33. The second restoring unit 9 is also formed from an elastic material as an elastic bellows 13.

The second restoring unit 9 is arranged at its second end opposite the first end between the first housing part 11 and a second housing part 12, the second restoring unit 9, encompassing the second housing part 12, being configured in an L-shape, and comprising a substantially triangular web 34 touching a housing part top side 27. The first and second housing parts 11, 12 form the housing 10 of the stepped stroke button 1. In addition, a long leg 29 of the Ls is formed with a plurality of elevations and depressions through which a labyrinth seal 14 is implemented. The design of the Ls, the labyrinth seal 14 and the web 34 all serve to reliably seal an inner housing space 35 from external influences. In the shown example, each of the transmission unit 2, the operating unit 5, the contact unit 7, the first restoring unit 8, and the second restoring unit 9 is formed as a monolithic parts, but it is within the scope of the present invention that any of these units may be assembled from several parts affixed to each other to form the respective unit.

Figure 2:
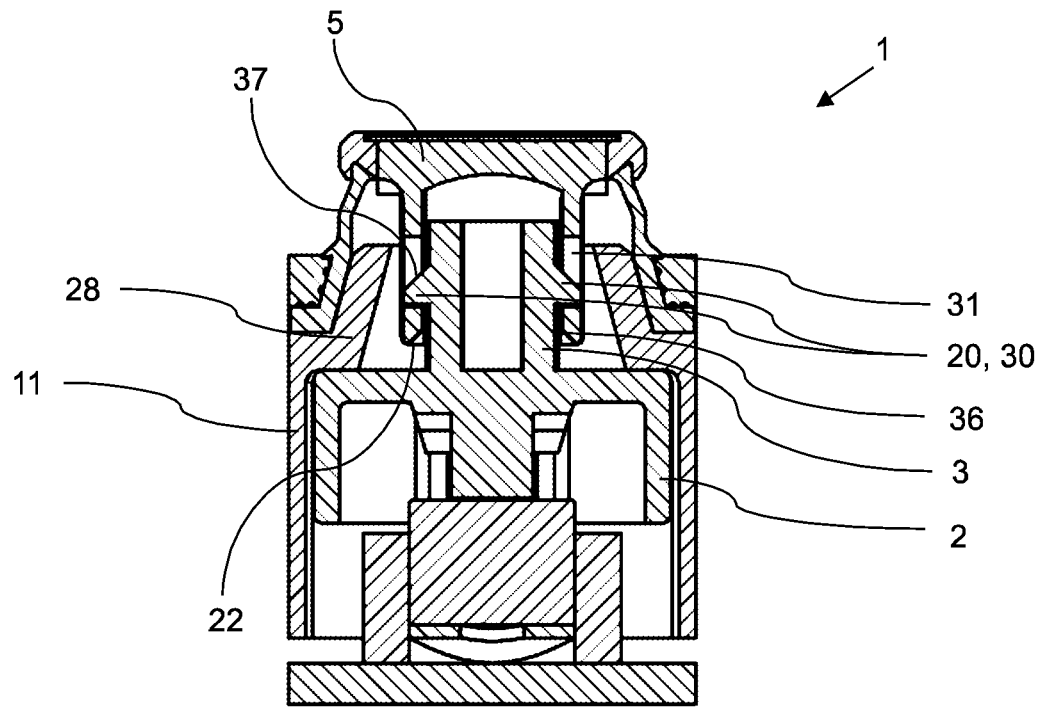
FIG. 2 shows a second sectional view in an initial position of the stepped stroke button.

FIG. 2 shows a second sectional view in an initial position of the stepped stroke button 1, the second sectional view being oriented orthogonally to the first sectional view. The transmission unit 2, at its first end 3, comprises two jump-shaped lugs 20 arranged opposite one another and mirrored in a movement axis. A second bevel 37 of the jump shape of the lugs 20 is directed upwards in each case. The lugs 20 are configured as a third stop 30 for the operating unit 5, the two lugs 20 each being arranged in one of two opposing openings 31 of the operating unit 5. The lugs 20 are in contact with the operating unit 5 and limit the upward axial displacement of the operating unit 5. In addition, the first housing part 11 is configured trapezoidal within the tapering region 28. The open end face 22 comprises two bevels tapering towards one another, a first bevel 36 being formed in each case parallel to the second bevel 37 of the lug 20.

Figure 3:
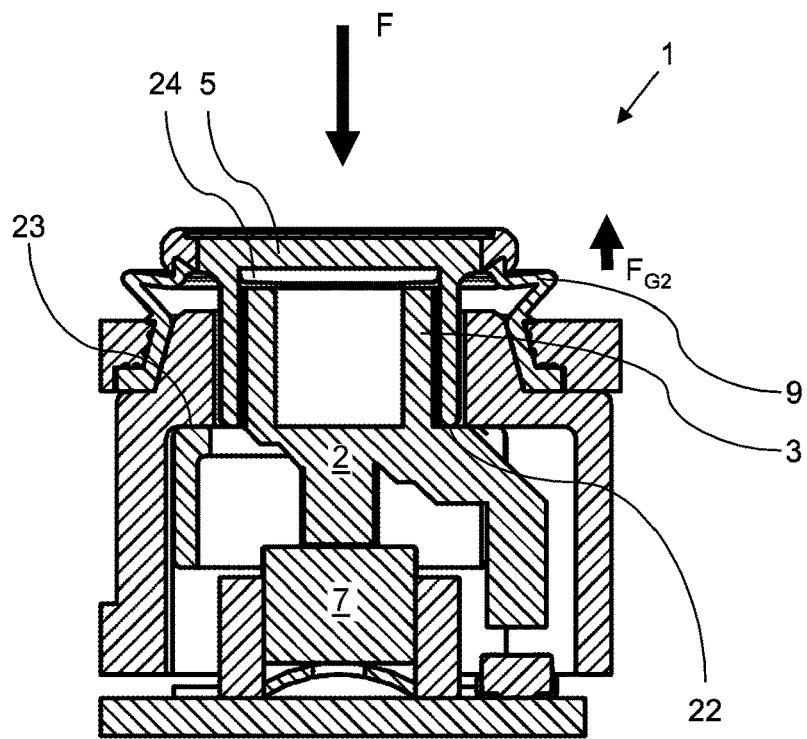
FIG. 3 shows a first sectional view in a second position of the stepped stroke button.

FIG. 3 shows a first sectional view in an intermediate position of the stepped stroke button 1 during its actuation, the operating unit 5 being moved by an axial force F in the direction of the transmission unit 2, so that the stop surface 23 is in contact with the open end face 22. The first end 3 is furthermore arranged at a distance from the inner end face 24. The second restoring unit 9 is elastically deformed by the axial movement of the operating unit 5 and has a second counterforce $F_{G2}$ directed against the axial force F and acting directly on the operating unit 5. The transmission unit 2 and the contact unit 7 are immobile in comparison to the illustration in FIG. 1, which forms a free travel of the operating unit 5.

Figure 4:
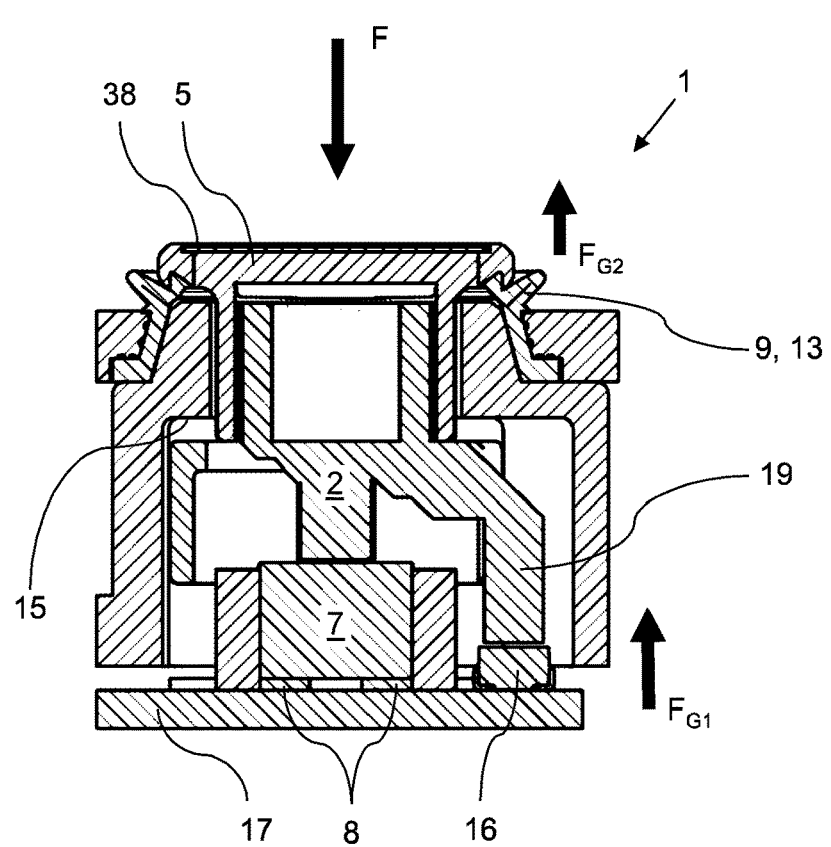
FIG. 4 shows a first sectional view in an actuated position of the stepped stroke button.

FIG. 4 shows a first sectional view in an actuated position of the stepped stroke button 1, the axial force F acting on the contact unit 7 via the operating unit 5 and the transmission unit 2 and comprising a substantially triangular web 34 and this being moved such that it is indirectly in contact with the circuit board 17, particularly via the first restoring unit 8. The operating unit 5, the transmission unit 2 and the contact unit 7 move simultaneously within the intermediate position and the actuated position of the stepped stroke button 1. The elastic bellows 13 is maximally deformed and accordingly has its maximal second counterforce $F_{G2}$ to the axial force F. The first restoring unit 8, which is configured as a sheet metal spring, also has a maximum first counterforce $F_{G1}$ to the axial force F in this position. The distance between the sub-region 19 and the display unit 16 is reduced compared to that in an initial or intermediate position. In this embodiment, the transmission unit 2 is configured as a light guide unit, which guides the light emitted by the display unit 16 to the operating unit 5. Due to the ratio of the operating stroke O to the contact stroke C (illustrated in FIG. 1), the distance between the display unit 16 and the sub-region 19 is effectively shortened in all positions, so that the emitted light can be admitted into the light guide unit over a short distance and accordingly a reduction in losses, for example, through scattering, is advantageously implemented. For example, the maximum distance between the display unit 16 and the sub-region 19 may be no greater than 110% of the length of the contact stroke.

According to the invention, the operating unit 5 comprises a fully or partially transparent material, the emitted light guided through the light guide unit being recognizable for an operator through the operating unit 5. According to the invention, a label 38 is arranged on the operating unit 5, the label 38 being opaque. In a restoration, both the first and the second restoring unit 8, 9 act on the operating unit 5 between the actuated position and the intermediate position. Only the second restoring unit 9 acts on the operating unit 5 between the intermediate position and the initial position, since an upward directed movement of the transmission unit 2 and the contact unit 7 is limited by the first stop 15.

Figure 5:
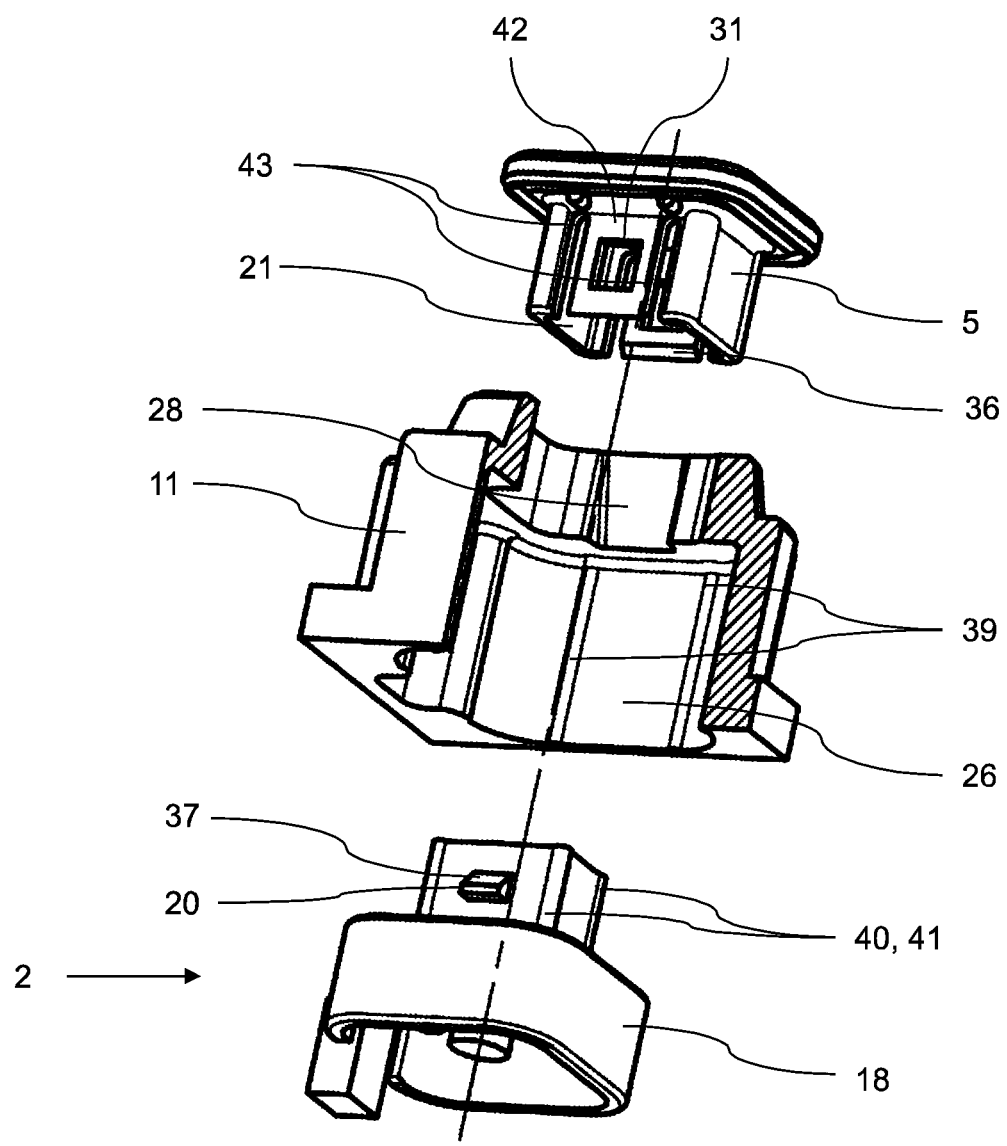
FIG. 5 shows an exploded drawing of the operating unit 5, the transmission unit 2 and the first housing part 11 as a partial section.

FIG. 5 shows an exploded drawing of the operating unit 5, the transmission unit 2 and the first housing part 11 as a partial section. The first housing part 11 comprises a second guide 39, the second guide 39 being configured in the form of vertically running ribs, two ribs per side surface being formed on the housing part inner surface 26, which ribs are in contact with the frame 18 in an assembled position. The transmission unit 2 comprises a third guide 40, the third guide 40 being configured in the form of vertically running ribs, a respective rib being formed in each outer edge 41 of the transmission unit 2, which rib, in an assembled position, is in contact with an inner operating unit circumferential surface 21. The operating unit 5 is assembled from above into the first housing part 11, the first and second bevels 36, 37 facing each other prior to assembly. In an opening region 42, the operating unit 5 comprises two perpendicular through grooves 43, which creates elasticity in the opening regions 42 arranged opposite one another. During assembly, the opening region 42 is pressed from above onto the lug 20, the first and second bevels 36, 37 being arranged in contact with one another and influencing the direction of the force such that a resulting transverse force reversibly deforms the opening regions 42 of the operating unit 5 outwards, so that one lug 20 each slides into an opening 31 and the opening region 42 then returns to its original arrangement.

The tapering region 28 is advantageously formed partially trapezoidal in order to provide space to the reversible deformation of the opening region 42 during assembly. When the assembly is completed, the operating unit 5 is limited in its axial freedom of movement by a form fit, particularly by a snap-hook connection to the transmission unit 2. Further reasons for the formation of the first and second bevels 36, 37 are the approximation of the structural shape to the force profile in this region during a load as well as the necessary draft angles for reliable demolding of molded parts from a tool. Draft angles are particularly relevant when manufacturing molded parts by injection molding processes. The transmission unit 2 is assembled in the first housing part 11 from below.

While the above description pertains to the preferred embodiments of the present invention, the invention is susceptible to modification, variation and change without departing from the proper scope and fair meaning of the accompanying claims.

LIST OF REFERENCE NUMERALS 1 stepped stroke button
2 transmission unit
3 first end
4 second end
5 operating unit
6 first guide
7 contact unit
8 first restoring unit
9 second restoring unit
10 housing
11 first housing part
12 second housing part
13 elastic bellows
14 labyrinth seal
15 first stop
16 display unit
17 circuit board
18 frame
19 sub-region
20 lug
21 inner operating unit circumferential surface
22 open end face
23 stop surface
24 inner end face
25 outer surface
26 housing part inner surface
27 housing part top side
28 tapering region
29 long leg
30 third stop
31 opening
32 outer end face
33 edge
34 web
35 housing space
36 first bevel
37 second bevel
38 label
39 second guide
40 third guide
41 outer edge
42 opening region
43 through grooves
FG1 first counterforce
FG2 second counterforce
F axial force
O operating stroke
C contact stroke

The invention claimed is:

1. A stepped stroke button comprising:
a transmission unit having a first end and a second end opposite the first end;
an operating unit arranged at the first end; and
a contact unit arranged at the second end and axially guided in a first guide,
at least one of the operating unit and the contact unit being configured to be axially movable with respect to the transmission unit,
wherein, during operation of the stepped stroke button, an operating stroke occurring relative to the first guide is configured differently from a mediated contact stroke occurring relative to the first guide, the ratio of the operating stroke to the contact stroke being greater than 1:1,
wherein a first restoring unit acts at least indirectly on the contact unit and the operating unit, and
a second restoring unit acts at least indirectly on the operating unit, wherein the second restoring unit is configured as an elastic bellows arranged between the operating unit and the housing.

2. The stepped stroke button according to claim 1, wherein the ratio of the operating stroke to the contact stroke is between 1.0001:1 and 1.5:1 and wherein the operating stroke is greater than or equal to 1.5 mm.

3. The stepped stroke button according to claim 1, wherein an axial force exerted on the operating unit acts at least partially through the transmission unit on the contact unit.

4. The stepped stroke button according to claim 1, wherein the elastic bellows is configured as a compression spring unit.

5. The stepped stroke button according to claim 1, further comprising a display unit, wherein at least one of the operating unit and the transmission unit is configured as a light guide unit, wherein a maximum distance between the light guide unit to a light source is at most 10% greater than the contact stroke.

6. The stepped stroke button according to claim 1, wherein the second restoring unit is configured as a seal between the operating unit and the housing.

7. The stepped stroke button according to claim 6, wherein the second restoring unit is configured as a labyrinth seal arranged on the second housing part.

8. The stepped stroke button according to claim 1, wherein the first housing part comprises at least one first stop for the transmission unit and the transmission unit comprises at least one second stop for the operating unit.

9. The stepped stroke button according to claim 1, wherein the first stop is configured as a radially fully encompassing stop.

10. The stepped stroke button according to claim 1, wherein the first housing part comprises a second guide, wherein the transmission unit is guided over the second guide and the transmission unit comprises a third guide, wherein the operating unit is guided over the third guide.

11. A stepped stroke button comprising:
a transmission unit having a first end and a second end opposite the first end;
an operating unit arranged at the first end; and
a contact unit arranged at the second end and axially guided in a first guide,
at least one of the operating unit and the contact unit being configured to be axially movable with respect to the transmission unit,
wherein, during operation of the stepped stroke button, an operating stroke occurring relative to the first guide is configured differently from a mediated contact stroke occurring relative to the first guide, the ratio of the operating stroke to the contact stroke being greater than 1:1,
wherein a first restoring unit acts at least indirectly on the contact unit and the operating unit,
a second restoring unit acts at least indirectly on the operating unit,
further comprising a housing having a first and a second housing part, wherein the first guide, the contact unit, the first restoring unit, the transmission unit, and the operating unit are accommodated in the first housing part and the second restoring unit is accommodated in the second housing part.

12. The stepped stroke button according to claim 11, wherein the second restoring unit is configured as a seal between the operating unit and the housing.

13. The stepped stroke button according to claim 12, wherein the second restoring unit is configured as a labyrinth seal arranged on the second housing part.

14. The stepped stroke button according to claim 11, wherein the first housing part comprises at least one first stop for the transmission unit and the transmission unit comprises at least one second stop for the operating unit.

15. The stepped stroke button according to claim 11, wherein the first stop is configured as a radially fully encompassing stop.

16. The stepped stroke button according to claim 11, wherein the first housing part comprises a second guide, wherein the transmission unit is guided over the second guide and the transmission unit comprises a third guide, wherein the operating unit is guided over the third guide.

17. The stepped stroke button according to claim 11, further comprising a display unit, wherein at least one of the operating unit and the transmission unit is configured as a light guide unit, wherein a maximum distance between the light guide unit to a light source is at most 10% greater than the contact stroke.

\* \* \* \* \*